(No Model.)
F. A. KILLPACK.
DEVICE FOR UNLOADING HAY.
No. 517,867. Patented Apr. 10, 1894.
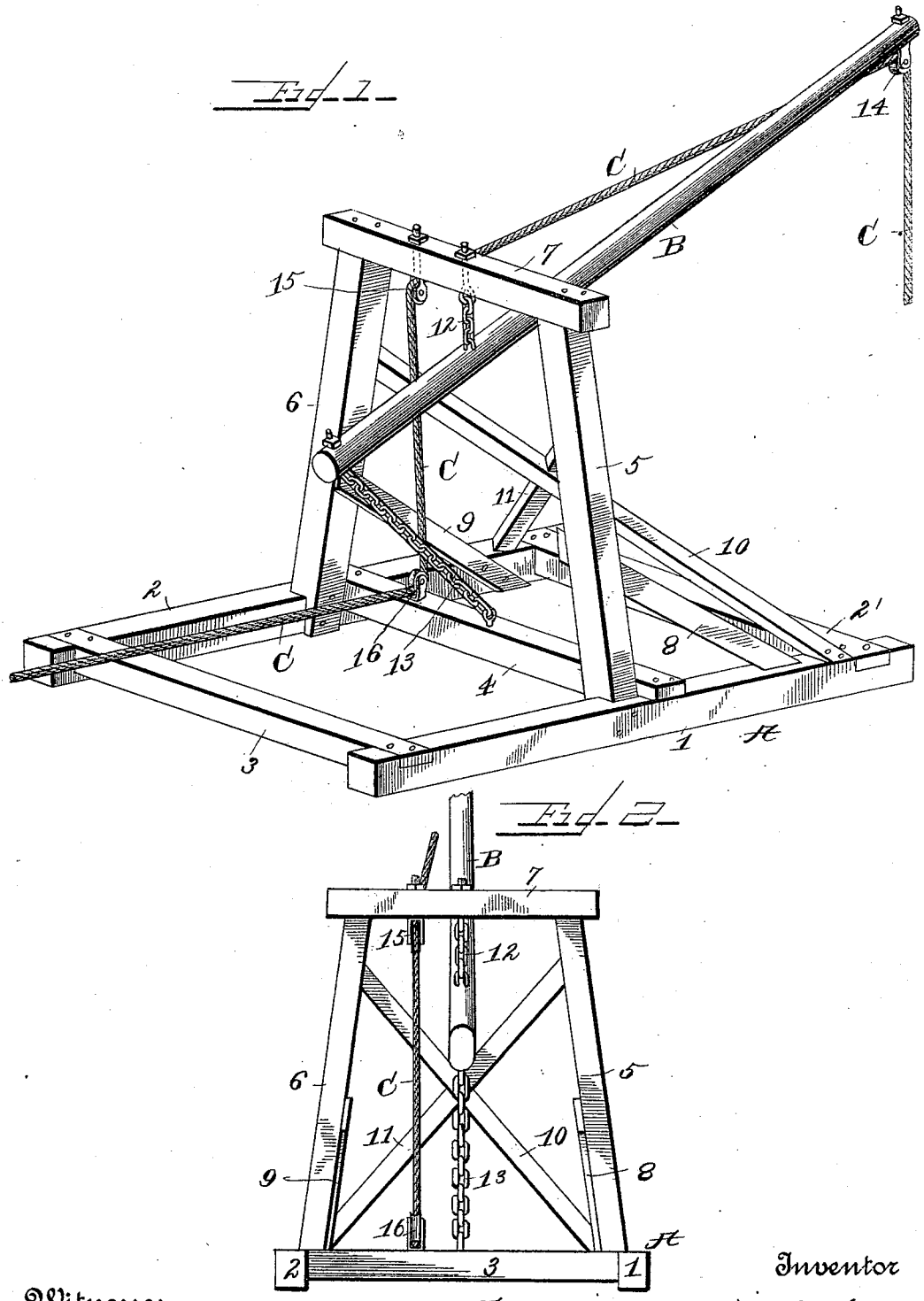
Witnesses
G. A. Taubenschmidt
James B. Lawrence
Inventor
Frederick A. Killpack
by
Harvey & ———, Attorneys

UNITED STATES PATENT OFFICE.

FREDERICK ARTHUR KILLPACK, OF FERRON, UTAH TERRITORY.

DEVICE FOR UNLOADING HAY.

SPECIFICATION forming part of Letters Patent No. 517,867, dated April 10, 1894.

Application filed November 25, 1892. Serial No. 453,067. (No model.)

*To all whom it may concern:*

Be it known that I, FREDERICK ARTHUR KILLPACK, a citizen of the United States, residing at Ferron, in the county of Emery and Territory of Utah, have invented certain new and useful Improvements in Devices for Unloading Hay, of which the following is a specification.

My invention relates to a device for unloading hay, and designed especially for transferring hay from a wagon to a stack.

The invention consists in the combination with a horizontal supporting frame, of an upright frame suitably braced, a suspended lever, and cord and pulley mechanism all constructed and relatively arranged as hereinafter fully described.

In the accompanying drawings Figure 1 is a view in perspective of the invention, and Fig. 2 is a rear elevation of the same.

A indicates the horizontal frame or support of the machine consisting of parallel bars 1 and 2, and cross-bars 2 and 3 and central cross-bar 4.

The upright frame of the machine consists of standards 5 and 6, secured at their lower ends to the bars 1 and 2, and a cross-bar 7 which connects the upper ends of the standards 5 and 6. The standards are braced to the horizontal frame by short diagonal braces 8 and 9, and by crossed diagonal braces 10 and 11, the ends of the braces being secured respectively to the side bars 1 and 2 and the standards 5 and 6 as shown.

B indicates a pole or lever, suspended from the cross-bar 7 by means of a short chain 12, or similar loose connection, the attachment to the pole being greatly in rear of the center of the length of the pole, and the rear end of the latter is made thicker and heavier than the front end so that the front end is normally elevated as shown in the drawings. The rear end of the pole is connected by a chain 13, to the central cross-bar 4, to steady the pole during the unloading operation. I employ three pulleys, 14, 15, and 16, one depending from the front end of the pole B, one depending from the upper cross-bar 7, and one supported upon the central cross-bar 4. Each of these pulleys is supported in a swiveled or pivotal bracket to enable the pulley to yield to accommodate themselves to the exigencies of the work, it being sometimes desirable to unload from the left and sometimes from the right of the stack. A cord C, passes under the pulley 16 and over the pulleys 14 and 15. To the front end of the cord it is designed to attach any preferred form of hay-fork, while the rear end of the cord is provided with a hook or attachment to a draft device.

The operation of the machine as thus constructed is as follows: The machine is located at one side of the stack, and the load of hay is drawn under the front or fork end of the pole B. The fork is inserted into the hay and by hitching a horse to the front end of the rope, the fork full of hay is raised, and the pole is caused to swing to the right or left, (accordingly as the pulleys are adjusted) and at the proper time the fork is tripped to deliver the hay onto the stack.

If desired the horizontal platform may be mounted upon wheels to facilitate its transportation.

It will be apparent that the automatic swinging of the pole to the right or left is governed by the position of the pulley 15, and that the machine affords a convenient, durable, and inexpensive apparatus for the purpose in view.

I claim—

The hay loader, herein described, comprising a suitable base "A," standards secured to the base and connected at the tops by a cross-bar "7," a chain "12" secured to and depending from the cross-bar, a lever "B" hung to the chain "12," a stay-chain "13," having one end secured to the lower end of the lever "B," and the lever end anchored to the base "A," a pulley "14" on the outer end of the lever "B," a pulley "15" depending from the cross-piece of the standards, a pulley "16" mounted on the base "A," and a lifting rope on the said pulleys, all arranged and combined substantially as shown and specified.

In witness whereof I hereunto set my hand in the presence of two witnesses.

FREDERICK ARTHUR KILLPACK.

Witnesses:
T. W. MARKER,
A. G. CONOVER.